United States Patent
Yang (10) Patent No.: US 10,816,853 B2
(45) Date of Patent: Oct. 27, 2020

(54) BACKLIGHT MODULE AND LIQUID CRYSTAL DISPLAY DEVICE

(71) Applicant: Wuhan China Star Optoelectronics Technology Co., Ltd., Wuhan (CN)

(72) Inventor: Yong Yang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 66 days.

(21) Appl. No.: 16/319,364

(22) PCT Filed: Jan. 9, 2019

(86) PCT No.: PCT/CN2019/070981
§ 371 (c)(1),
(2) Date: Jan. 21, 2019

(87) PCT Pub. No.: WO2020/042525
PCT Pub. Date: Mar. 5, 2020

(65) Prior Publication Data
US 2020/0124919 A1    Apr. 23, 2020

(30) Foreign Application Priority Data

Aug. 31, 2018 (CN) .......................... 2018 1 1014759

(51) Int. Cl.
G02F 1/13357    (2006.01)

(52) U.S. Cl.
CPC .. *G02F 1/133606* (2013.01); *G02F 1/133611* (2013.01); *G02F 1/133603* (2013.01); *G02F 2001/133607* (2013.01)

(58) Field of Classification Search
CPC ......... G02F 1/133603; G02F 1/133606; G02F 1/133611; G02F 2001/133607
See application file for complete search history.

(56) References Cited

U.S. PATENT DOCUMENTS

| | | | |
|---|---|---|---|
| 2007/0110386 A1* | 5/2007 | Chiang | G02F 1/133606 385/147 |
| 2016/0154147 A1* | 6/2016 | Kwon | G02B 6/0053 349/62 |
| 2016/0291385 A1* | 10/2016 | Yoshikawa | G02F 1/133606 |
| 2017/0261178 A1* | 9/2017 | Shigeno | F21V 3/12 |

* cited by examiner

Primary Examiner — Alexander P Gross (57) ABSTRACT

A backlight module is provided. The backlight module includes a substrate; a plurality of light emitting elements disposed on the substrate; an optical film disposed on the plurality of light emitting elements; a plurality of light mixing microstructures disposed on the optical film, positions of the light mixing microstructures corresponding to positions of the plurality of light emitting elements; and a plurality of concentrating microstructures correspondingly disposed on the plurality of light mixing microstructures, wherein positions of the plurality of concentrating microstructures correspond to the positions of the plurality of light emitting elements. A liquid crystal display (LCD) device including the backlight module is also provided.

15 Claims, 6 Drawing Sheets

BACKLIGHT MODULE AND LIQUID CRYSTAL DISPLAY DEVICE

RELATED APPLICATIONS

This application is a National Phase of PCT patent application Ser. No. PCT/CN2019/070981 having International filing date of Jan. 9, 2019 which claims the benefit of priority of Chinese Patent Application No. 201811014759.X filed on Aug. 31, 2018. The contents of the above applications are all incorporated by reference as if fully set forth herein in their entirety.

FIELD AND BACKGROUND OF THE INVENTION

This disclosure relates to display technology, and particularly to a backlight module, and a liquid crystal display device.

A liquid crystal display (LCD) panel does not have a light emitting function itself. Therefore, a backlight module must be disposed below the liquid crystal display panel to provide a surface light source to the LCD panel. Light emitting diodes (LEDs) have been widely used in backlight modules because of their high brightness, low power consumption, long life, and less thermal problems.

Mini-LEDs, as a surface light source and a backlight module, include many advantages, such as being light weight and thin, flexible, bendable, high brightness, low power consumption, and the like. Mini-LEDs can overcome a limitation of a light-mixing distance in a conventional edge light backlight module. By manufacturing a narrow border full screen, a partition control display of the backlight module can be realized, and a high dynamic contrast display device can be manufactured. However, due to an influence of light shape and arrangement of the Mini-LEDs, the surface light source may have drawbacks such as uneven brightness of an inner surface of the Mini-LEDs, low brightness at a front side of the Mini-LEDs, and a light utilization rate lower than that of the conventional edge light backlight module. Therefore, it is necessary to dispose a diffusion sheet and/or a prism sheet above the light source surface to improve light-mixing effect at the front side of the Mini-LEDs and to increase brightness of the Mini-LEDs.

For a structure of the conventional prism sheet, a cross section of the conventional prism sheet is usually an isosceles right triangle, which is not conducive to light acquisition and utilization in a surface light source. Light with small angle will cause multiple reflections in the conventional prism sheet, and that causes the front side of the surface light source of the Mini-LEDs low in brightness. These drawbacks, which have become an urgent problem, need to be solved to reduce the multiple reflections in the front side of the surface light source of the Mini-LEDs.

Therefore, it is necessary to provide a backlight module and a LCD device, which reduce the drawbacks of multiple reflections of the surface light source in a concentrating process of a conventional brightness enhancement film (BEF), and increase overall light emitting effectiveness of the surface light source of the Mini-LEDs.

SUMMARY OF THE INVENTION

In order to solve the above drawbacks, the disclosure provides a microstructure having a light mixing effect and a lens microstructure and a prism microstructure having a light collecting effect on an upper surface of an optical film layer of a light emitting element of a surface light source. Under the condition of achieving light mixing uniformly, the effect of multiple reflections inside the surface light source is reduced during concentrating process, a proportion of light energy in one light output is increased, and light emitting efficiency of the surface light source is improved.

To achieve the above object, the disclosure provides a backlight module. The backlight module comprises: a substrate; a plurality of light emitting elements disposed on the substrate; an optical film disposed on the plurality of light emitting elements; a plurality of light mixing microstructures disposed on the optical film, positions of the light mixing microstructures corresponding to positions of the plurality of light emitting elements; a plurality of concentrating microstructures correspondingly disposed on the plurality of light mixing microstructures, wherein positions of the plurality of concentrating microstructures correspond to the positions of the plurality of light emitting elements; wherein a width of each of the light mixing microstructures is the same as a width of each of the light emitting elements.

According to an embodiment of the backlight module described in the disclosure, each of the light emitting elements has an optical axis, and a shape of each of the light mixing microstructures is bilaterally symmetric with respect to an optical axis of a corresponding one of the light emitting elements. That is, each of the light mixing microstructures has the same size as the corresponding light emitting element and is disposed directly above the corresponding light emitting element.

According to an embodiment of the backlight module described in the disclosure, an optical axis of each of the light emitting elements is served as a symmetry axis of a corresponding one of the concentrating microstructures, and a shape of each of the concentrating microstructures is bilaterally symmetrical with respect to the symmetry axis.

According to an embodiment of the backlight module described in the disclosure, each of the concentrating microstructures is bilaterally symmetric with respect to a central axis of a corresponding one of the light mixing microstructures.

According to an embodiment of the backlight module described in the disclosure, each of the concentrating microstructures comprises a lens microstructure and a prism microstructure, the lens microstructure is disposed on the each of the light mixing microstructures, and the prism microstructure is disposed on the each of the lens microstructures.

According to an embodiment of the backlight module described in the disclosure, the prism microstructure has a triangular prism structure.

According to an embodiment of the backlight module described in the disclosure, a refractive index of the lens microstructure is greater than a refractive index of the prism microstructure.

According to an embodiment of the backlight module described in the disclosure, a refractive index of the light mixing microstructure is less than or equal to a refractive index of the optical film.

According to an embodiment of the backlight module described in the disclosure, the backlight module further comprises a diffusion film layer disposed on the plurality of concentrating microstructures.

To achieve the above object, the disclosure further provides a backlight module. The backlight module comprises: a substrate; a plurality of light emitting elements disposed on the substrate; an optical film disposed on the plurality of light emitting elements; a plurality of light mixing microstructures disposed on the optical film, positions of the light mixing microstructures corresponding to positions of the plurality of light emitting elements; a plurality of concentrating microstructures correspondingly disposed on the plurality of light mixing microstructures, wherein positions of the plurality of concentrating microstructures correspond to the positions of the plurality of light emitting elements; wherein a width of each of the light mixing microstructures is the same as a width of each of the light emitting elements.

According to an embodiment of the backlight module described in the disclosure, each of the light emitting elements has an optical axis, and a shape of each of the light mixing microstructures is bilaterally symmetric with respect to an optical axis of a corresponding one of the light emitting elements. That is, each of the light mixing microstructures has the same size as the corresponding light emitting element and is disposed directly above the corresponding light emitting element.

According to an embodiment of the backlight module described in the disclosure, an optical axis of each of the light emitting elements is served as a symmetry axis of a corresponding one of the concentrating microstructures, and a shape of each of the concentrating microstructures is bilaterally symmetrical with respect to the symmetry axis.

According to an embodiment of the backlight module described in the disclosure, each of the concentrating microstructures is bilaterally symmetric with respect to a central axis of a corresponding one of the light mixing microstructures.

According to an embodiment of the backlight module described in the disclosure, each of the concentrating microstructures comprises a lens microstructure and a prism microstructure, the lens microstructure is disposed on the each of the light mixing microstructures, and the prism microstructure is disposed on the each of the lens microstructures.

According to an embodiment of the backlight module described in the disclosure, the prism microstructure has a triangular prism structure.

According to an embodiment of the backlight module described in the disclosure, a refractive index of the lens microstructure is greater than a refractive index of the prism microstructure.

According to an embodiment of the backlight module described in the disclosure, a refractive index of the light mixing microstructure is less than or equal to a refractive index of the optical film.

According to an embodiment of the backlight module described in the disclosure, the backlight module further comprises a diffusion film layer disposed on the plurality of concentrating microstructures.

To achieve the above object, the disclosure further provides a liquid crystal display device comprising the backlight module as above mentioned.

The disclosure provides the backlight module and the liquid crystal display device to improve the design of the conventional prism sheet microstructure and to improve a structural arrangement of the light mixing microstructure and the concentrating microstructure relative to the diffusion film layer. The disclosure provides a plurality of light mixing microstructures (such as light mixing layer) and a plurality of concentrating microstructures (such as concentrating layer) on the optical film layer above the surface light source of light emitting elements, and the light mixing microstructures (such as light mixing layer) are disposed directly above the surface of the optical film layer of light emitting elements to prevent uneven light mixing. In addition, the lens microstructure and the prism microstructure are disposed on the light mixing microstructure to increase a proportion of light energy in one light output during the concentrating process, and reduce the light absorption and light reflection loss inside the surface light source, thereby improving the light emitting efficiency of the surface light source.

BRIEF DESCRIPTION OF THE SEVERAL VIEWS OF THE DRAWINGS

In order to more clearly illustrate the embodiments of the present invention or the technical solutions in the prior art, the following briefly introduces accompanying drawings used in the embodiments. Obviously, the drawings in the following description merely show some of the embodiments of the present invention. As regards one of ordinary skill in the art, other drawings can be obtained in accordance with these accompanying drawings without making creative efforts.

DESCRIPTION OF SPECIFIC EMBODIMENTS OF THE INVENTION

This description of the exemplary embodiments is intended to be read in connection with the accompanying drawings, which are to be considered part of the entire written description. In the description, terms such as "lower", "upper", "horizontal", "vertical", "above", "below", "up", "down", "top", and "bottom", as well as derivatives thereof, should be construed to refer to the orientation as then described or as shown in the drawings under discussion. These terms are for convenience of description, and do not require that the apparatus to be constructed or operated in a particular orientation, and do not limit the scope of the disclosure. Referring to the drawings of the disclosure, similar elements are labeled by the same number. The embodiments of the disclosure are described in detail below with reference to the accompanying drawings.

For a conventional prism structure, a cross section of the conventional prism structure is usually an isosceles right triangle, which is not conducive to light acquisition and utilization in the surface light source of the conventional prism structure, and light with small angle will cause multiple reflections and light loss in the conventional prism structure. The drawbacks are improved as follows.

Figure 1:
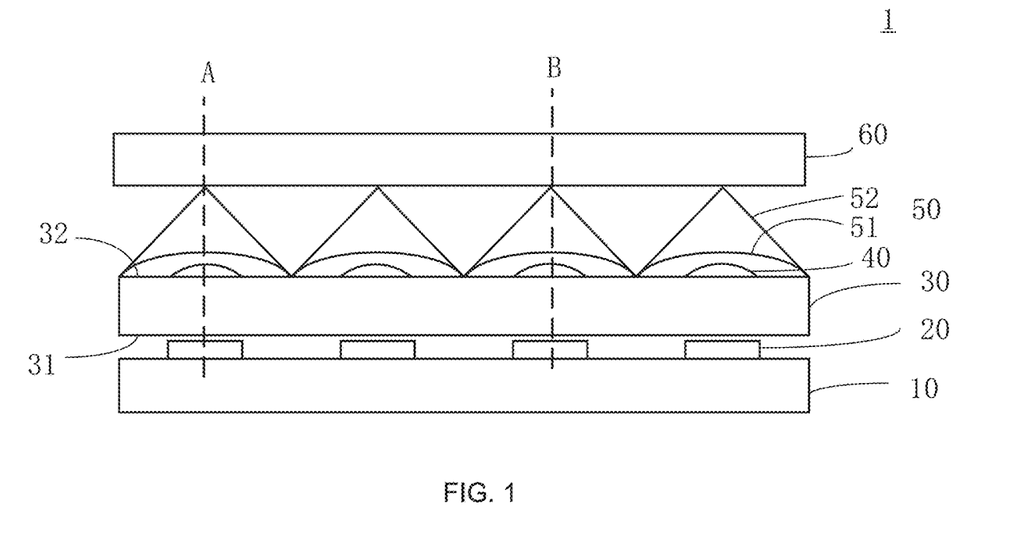
FIG. 1 is a cross-sectional structural schematic view of a backlight module of the disclosure.

Referring to FIG. 1 and FIG. 3A to FIG. 3C, a cross-sectional structural schematic view of a backlight module of the disclosure, a schematic diagram of light energy variation within a range of illumination angles of the surface light source of the backlight module of the disclosure, and a schematic diagram of light-emitting paths of the light mixing microstructure and the concentrating microstructure in the backlight module of the disclosure are shown. As shown in FIG. 1, the present invention provides a backlight module 1. The backlight module 1 comprises a substrate 10, a plurality of light emitting elements 20 disposed on the substrate 10, an optical film 30 disposed on the plurality of light emitting elements 20, a plurality of light mixing microstructures 40 disposed on the optical film 30, positions of the light mixing microstructures 40 corresponding to positions of the plurality of light emitting elements 20, a plurality of concentrating microstructures 50 correspondingly disposed on the plurality of light mixing microstructures 40, and positions of the plurality of concentrating microstructures 50 correspond to the positions of the plurality of light emitting elements 20.

The substrate 10 is a flexible FPC board or a hard PCB board. Each of the plurality of light emitting elements 20 is, but not limited to, a blue chip, also referred as a sub-millimeter light emitting diode (LED). Each of the plurality of light emitting elements 20 comprises a length and a width, the length and the width of which are respectively in a range between 100 microns to 500 microns. The optical film 30 comprises a material comprising a silicate phosphor material or a KSF phosphor material.

The optical film 30 has an inner surface 31 and an outer surface 32, the inner surface 31 is in contact with the plurality of light emitting elements 20, and the outer surface 32 is configured for disposing the plurality of light mixing microstructures 40.

It should be noted that each of the light-emitting elements 20 has an optical axis, and shapes of each of the light-mixing microstructures 40 is bilaterally symmetric with respect to the optical axis of a corresponding one of the light emitting elements 20. For example, an optical axis of each of the light emitting elements 20 is served as a symmetry axis A of a corresponding one of the light mixing microstructure 40, and a shape of each of the light mixing microstructure 40 is bilaterally symmetrical with respect to the symmetry axis A. That is, a width of the light-mixing microstructure 40 is the same as a width of the light-emitting element 20, and further, a length and a width of each of the light-mixing microstructures 40, and a length and a width of the light-emitting element 20 are almost the same. In addition, in different embodiments, a three-dimensional structure of the light-mixing microstructure 40 is similar to a three-dimensional structure of the light-emitting element 20, and they are both rectangular. The length and width of each of the light-mixing microstructures 40 are 1.5-2.5 times of the length, and width of each of the light-emitting elements 20, respectively. Moreover, a central axis of each of the light-mixing microstructures 40 is the same as a central axis of each of the light-emitting elements 20, such that the light-mixing microstructures 40 disposed directly above the corresponding light-emitting elements 20, so that a illuminance distribution is more uniform, and the light mixing effect is greatly improved.

A height (thickness) of the light-mixing microstructure 40 is in a range between 100 micrometers to 200 micrometers, and the height (thickness) of the light-mixing microstructure 40 ranging within the above-mentioned can ensure better light mixing uniformity.

Figure 2:
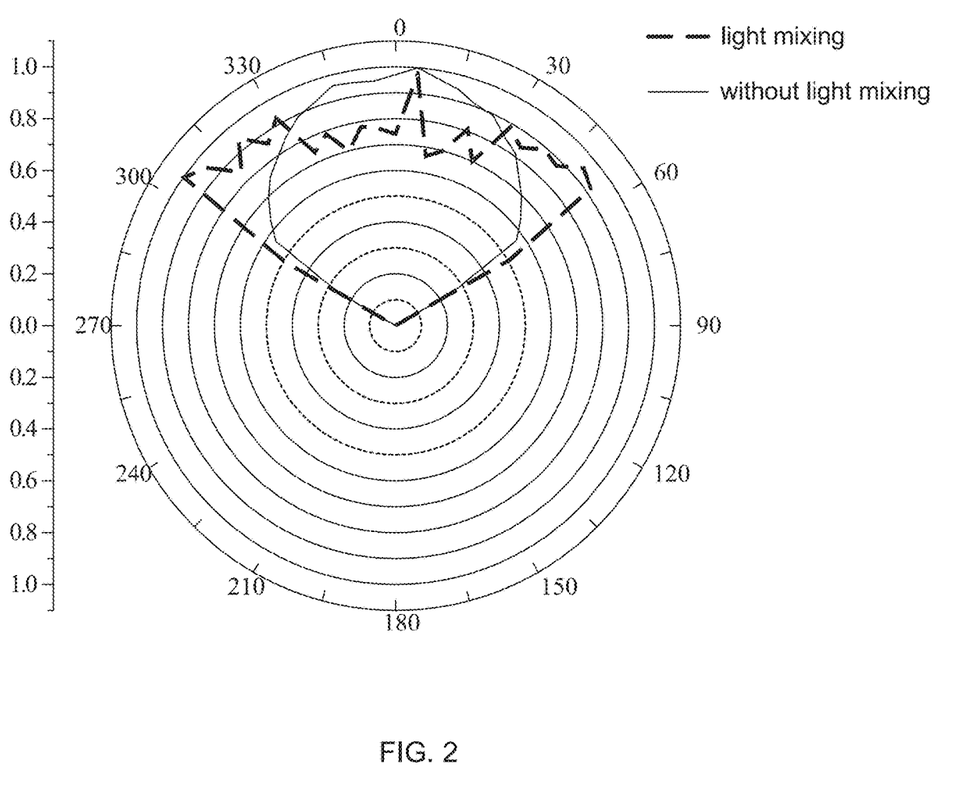
FIG. 2 is a schematic diagram of light energy variation within a range of illumination angles of a surface light source of the backlight module of the disclosure and of a conventional backlight module.

Moreover, each of the light-mixing microstructures 40 is manufactured by a nozzle spraying method or a stencil brushing method, so that the plurality of light-mixing microstructures 40 can also be presented in a form of a light-mixing microstructure layer. Each of the plurality of light-mixing microstructures 40 is mixed with a concentration of 30%-50% of diffusion particles, and the light-mixing microstructure 40 can diffuse light at an intermediate position of the light-emitting element 20 to reach an edged position of the light-emitting element 20, thereby ensuring that light is evenly distributed at various illumination angles within a range of illumination angles of the light-emitting element 20. As shown in FIG. 2, a schematic diagram of light energy variation within a range of illumination angles of the surface light source of the backlight module of the disclosure and of a conventional backlight module by software simulation are shown. It can be seen that the light-mixing microstructure makes the illuminance distribution more uniform, and greatly enhances the light mixing effect.

In an embodiment of the disclosure, the optical axis of each of the light emitting elements 20 is served as a symmetry axis B of a corresponding one of the concentrating microstructures 50, and a shape of each of the concentrating microstructures 50 is bilaterally symmetrical with respect to the symmetry axis B. A central axis of each of the concentrating microstructures 50 is the same as a central axis of each of the light-mixing microstructures 40, such that the concentrating microstructures 50 are bilaterally symmetrical with the light-mixing microstructures 40, respectively. After the light is refracted, a loss ratio of light entering into the concentrating microstructure 50 is small.

Each of the concentrating microstructures 50 comprises a lens microstructure 51 and a prism microstructure 52, the lens microstructure 51 is disposed on the each of the light mixing microstructures 40, and the prism microstructure 52 is disposed on the each of the lens microstructures 51. Both the lens microstructure 51 and the prism microstructure 52 are formed by a mold lamination method to ensure high preparation precision. A central axis of each of the lens microstructures 51 is the same as each of the central axis of each of the light mixing microstructures 40, such that the diffused light emerging from the light-mixing microstructure 40 passes through the lens microstructure 51 to become collimated light or approximately collimated light.

In an embodiment of the disclosure, a refractive index of the lens microstructure 51 is greater than a refractive index of the prism microstructure 52. This ensures that a primary light emitting ratio through the lens microstructure 51 is relatively high, and the proportion of light reflection absorption loss is small.

Figure 3A:
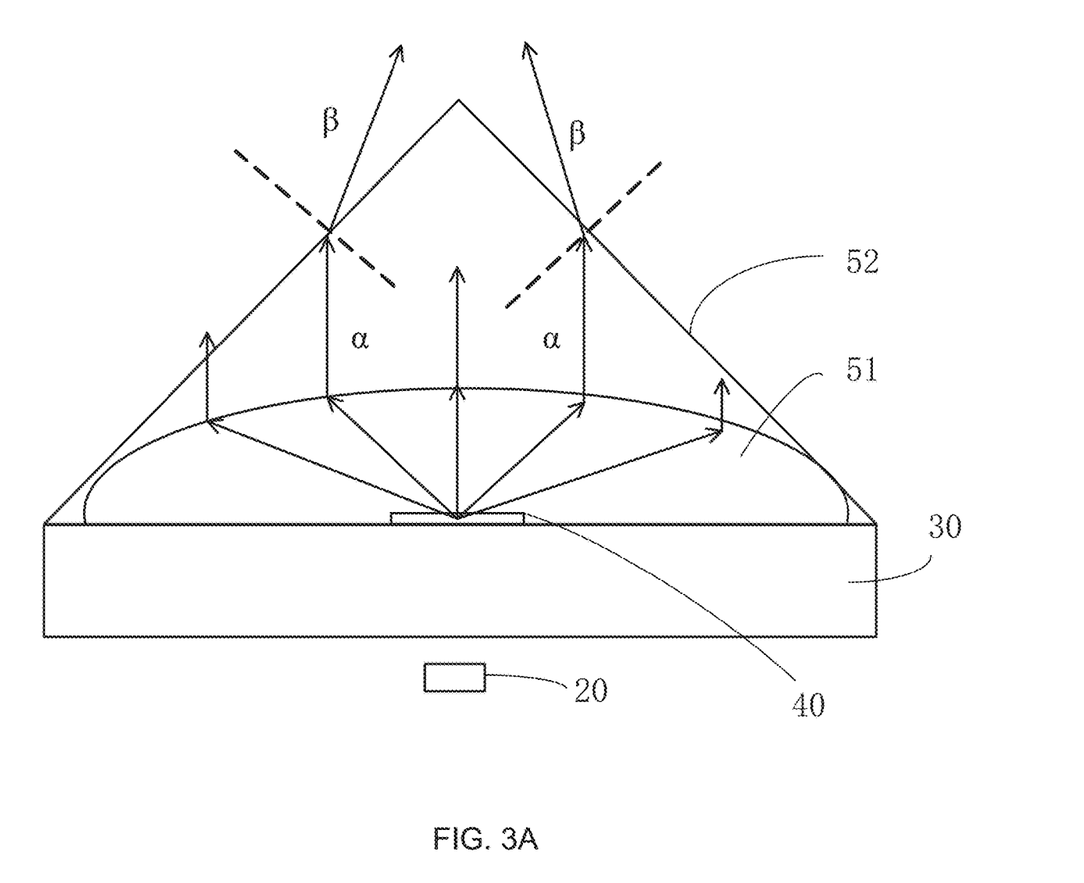
FIG. 3A is a schematic diagram of light-emitting paths of the light mixing microstructure and the concentrating microstructure in the backlight module of the disclosure.

In addition, as shown in FIG. 3A, the lens microstructure 51 is disposed above the light mixing microstructure 40, and the prism microstructure 52 disposed outside the light mixing microstructure 40 and the lens microstructure 51 is a triangular prism structure, i.e., a triangular prism structure outside the lens microstructure 51 is a prism microstructure 52. The diffused light is emitted from the light-emitting element 20, and passes through the light-mixing microstructure 40 via the lens microstructure 51 to become collimated light or approximately collimated light. The collimated light passing through the lens microstructure 51 enters a surface of the prism microstructure 51. An incident angle of the collimated light is a certain value, as shown in FIG. 3A. That is, α is a certain value, and according to a refractive index formula $n_2 \sin\alpha = n_3 \sin\beta$, a material of the lens microstructure 51 and a material of the prism microstructure 52 are selected. It is ensured that $\beta > \alpha$ as the collimated light passing through an interface of the prism microstructure 52, that is, the collimated light is concentrated after emitting. Because incident light and outgoing light both ensure the same geometric optical path, light emitting efficiency in one light emitting can be ensured to be increased.

Figure 3B:
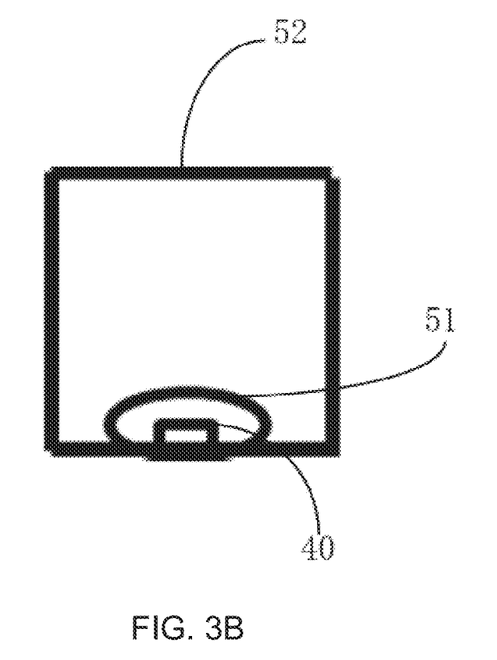
FIG. 3B is a schematic side view of light mixing microstructure and concentrating microstructure in backlight module of the disclosure.
Figure 3C:
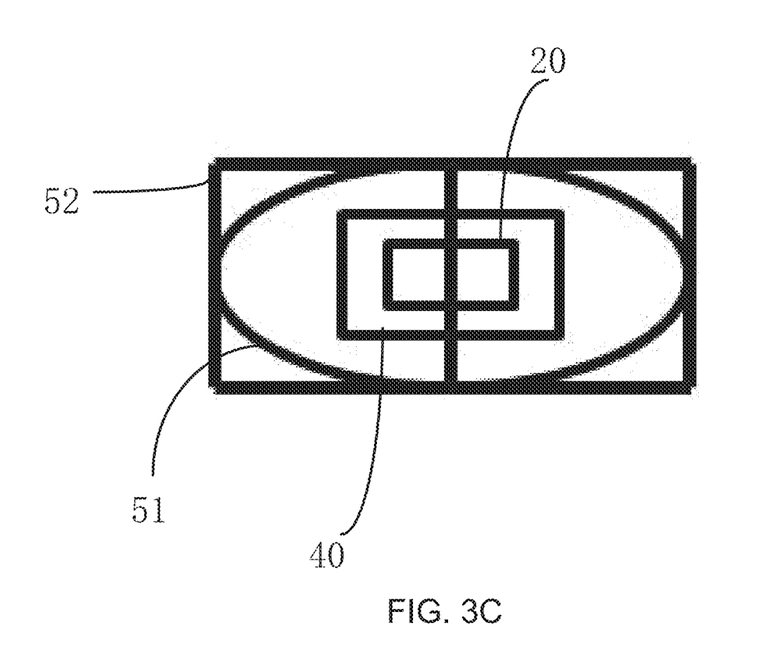
FIG. 3C is a schematic top view of light mixing microstructure and concentrating microstructure in backlight module of the disclosure.

In addition, as shown in FIG. 3B and FIG. 3C, schematic side/top views of light mixing microstructure and concentrating microstructure in a backlight module of the disclosure are shown respectively. The lens microstructure 51 is an ellipsoidal structure, and a major axis and a short axis of the ellipsoidal structure are respectively 2-5 times of a length of a long side, and a length of a short side of the light emitting element 20. A center point of light-mixing microstructure 40 is a focus point of the lens microstructure, i.e., the central axis of the lens microstructure 51 is the same as the central axis of the light mixing microstructure 40.

In addition, as shown in FIG. 3B and FIG. 3C and FIG. 3A, the prism microstructure 52 is a triangular pyramid structure, and a width of the prism microstructure 52 is the same as a width of the lens microstructure 51. A long side of the prism microstructure 52 exhibits a pillar-like structure.

In an embodiment of the invention, the light-mixing microstructure 40 has a refractive index less than or equal to a refractive index of the optical film 30. It is ensured that the light emitted by the light-emitting element 20 has a better light mixing effect. In more detail, a refractive index $n_1$ of the light-mixing microstructure 40 is substantially equal to a refractive index $n_2$ of the lens microstructure 51. For example, in one embodiment, the light-mixing microstructure 40 and the lens microstructure 51 are composed of an acryl resin material or a high refractive index resin material, and the prism microstructure 52 is composed of a low refractive index resin material or may be an air layer. The plurality of lens microstructures 51 can also be presented in the form of a lens microstructures layer, and the plurality of prism microstructures 52 can also be presented in the form of a prism microstructures layer. In addition, in different embodiments, the light mixing microstructure 40 is made of a high refractive index silica material, the lens microstructure 51 is made of a medium refractive index acrylic resin material, and the prism microstructure 52 is made of a low refractive index acrylic resin material (such as poly(methyl methacrylate), PMMA) or polycarbonate (PC) material.

Figure 4A:
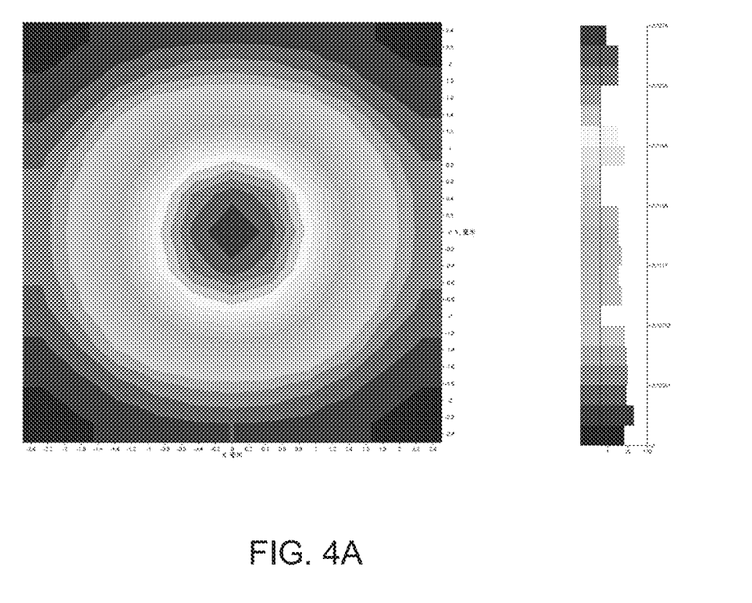
FIG. 4A is a schematic diagram of illuminance distribution of a surface light source of the conventional backlight module.
Figure 4B:
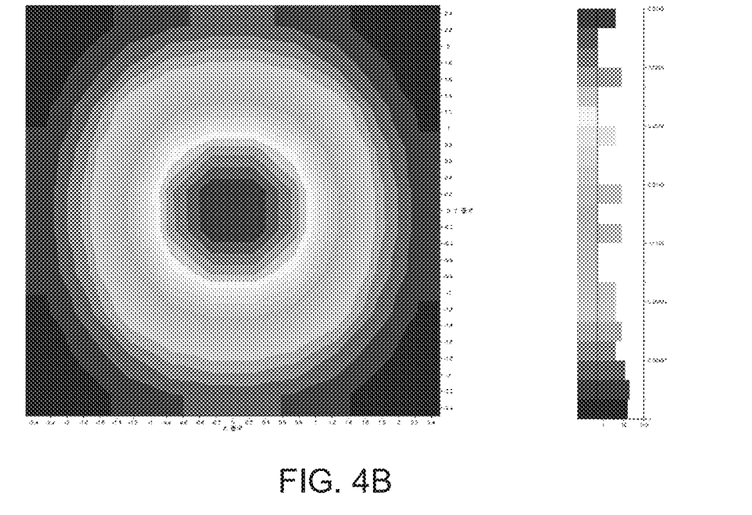
FIG. 4B is a schematic diagram of illuminance distribution of a surface light source of the backlight module of the disclosure.

In order to achieve a better light mixing effect, the backlight module 1 further includes a diffusion film layer 60 disposed on the plurality of concentrating microstructures 50 to mix the concentrated light. An arrangement of the conventional backlight module is, from top to bottom, a light-emitting element (light-emitting angle of 130°), a diffusion film, and a brightness-increasing film (BEF). The surface light source of the backlight module in this embodiment is, from top to bottom, a light-emitting element (close to collimated light), a light-mixing layer, concentrating layer, and a diffusion film layer. Referring to FIG. 4A and FIG. 4B, a schematic diagram of illuminance distribution of a surface light source of the conventional backlight module, and a schematic diagram of illuminance distribution of a surface light source of the backlight module of the disclosure are shown. The illuminance distributions shown in FIG. 4A and FIG. 4B are similar regarding to illuminance distribution, wherein an illuminance of FIG. 4A means that a square error is 0.0055, and an illuminance of FIG. 4B means that a square error is 0.0075, illustrating that the light mixing effect of the surface light source of the backlight module of the disclosure and the light mixing effect of the surface light source of the conventional backlight is equivalent. At the same time, under a condition of the same light source, a center relative illuminance of FIG. 4A is 0.0274, and a center relative illuminance of FIG. 4B is 0.0348, which is 27% higher than that of FIG. 4A. It proves that the backlight module of the disclosure is beneficial to greatly improving the light effect of the surface light source and reducing the light reflection loss between layers.

In addition, the disclosure further provides a liquid crystal display device including the backlight module, when the backlight module of the embodiment of the disclosure is applied to the liquid crystal display (LCD) device, such as a display screen, so that the backlight module enables the display screen to have a relatively uniform light intensity, and display quality is enhanced.

Figure 5:
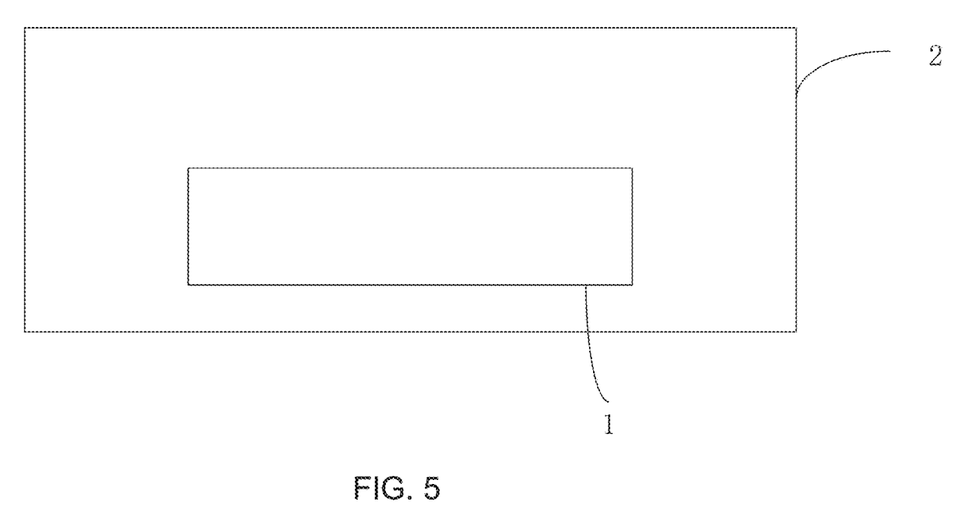
FIG. 5 is a schematic view of a liquid crystal display device comprising the backlight module of the disclosure.

As shown in FIG. 5, the disclosure also provides a liquid crystal display device 2 including the backlight module shown in FIG. 1.

In the backlight module of the disclosure and the LCD device, including the backlight module, the plurality of light mixing microstructures, the plurality of lens microstructures, and the plurality of prism microstructures are disposed on an optical film of the surface light source (can also be a light-mixing microstructure layer, a lens microstructures layer, and a prism microstructures layer). The lens microstructures and the prism microstructures are configured to increase the light emitting efficiency in one light emitting during the concentrating process, as well as to reduce light absorption and light reflection loss inside the surface light source. Thus, the light efficiency can be improved by the surface light source by 20%-30%. For the light mixing effect, the light mixing uniformity is maintained by disposing the light mixing microstructure to prevent significant uneven light mixing from occurring. Overall, the backlight module of the disclosure can ensure that the light mixing uniformity of the surface light source is close to a normal level, and the overall light efficiency of the surface light source is increased by 20%-30%.

This disclosure has been described with preferred embodiments thereof, and it is understood that many changes and modifications to the described embodiment can be carried out without departing from the scope and the spirit of the invention.

What is claimed is:

1. A backlight module, comprising:
a substrate;
a plurality of light emitting elements disposed on the substrate;
an optical film disposed on the plurality of light emitting elements;
a plurality of light mixing microstructures disposed on the optical film, positions of the light mixing microstructures corresponding to positions of the plurality of light emitting elements;
a plurality of concentrating microstructures correspondingly disposed on the plurality of light mixing microstructures, wherein positions of the plurality of concentrating microstructures correspond to the positions of the plurality of light emitting elements,
wherein each of the concentrating microstructures comprises a lens microstructure and a prism microstructure, the lens microstructure is disposed on each of the light mixing microstructures, and the prism microstructure is disposed on each of the lens microstructures, and wherein a refractive index of the lens microstructure is greater than a refractive index of the prism microstructure;

wherein a width of each of the light mixing microstructures is the same as a width of each of the light emitting elements.

2. The backlight module according to claim 1, wherein each of the light emitting elements has an optical axis, and a shape of each of the light mixing microstructures is bilaterally symmetric with respect to an optical axis of a corresponding one of the light emitting elements.

3. The backlight module according to claim 1, wherein an optical axis of each of the light emitting elements is served as a symmetry axis of a corresponding one of the concentrating microstructures, and a shape of each of the concentrating microstructures is bilaterally symmetrical with respect to the symmetry axis.

4. The backlight module according to claim 1, wherein each of the concentrating microstructures is bilaterally symmetric with respect to a central axis of a corresponding one of the light mixing microstructures.

5. The backlight module according to claim 1, wherein the prism microstructure has a triangular prism structure.

6. The backlight module according to claim 1, wherein a refractive index of the light mixing microstructure is less than or equal to a refractive index of the optical film.

7. The backlight module according to claim 1, wherein the backlight module further comprises a diffusion film layer disposed on the plurality of concentrating microstructures.

8. An LCD device comprising a backlight module according to claim 1.

9. A backlight module comprising:
a substrate;
a plurality alight emitting elements disposed on the substrate;
an optical film disposed on the plurality of light emitting elements;
a plurality of light mixing microstructures disposed on the optical film, positions of the light mixing microstructures corresponding to positions of the plurality of light emitting elements; and a plurality of concentrating microstructures correspondingly disposed on the plurality of light mixing microstructures, wherein positions of the plurality of concentrating microstructures correspond to the positions of the plurality of light emitting elements;

wherein each of the concentrating microstructures comprises a lens microstructure and a prism microstructure, the lens microstructure is disposed on each of the light mixing microstructures, and the prism microstructure is disposed on each of the lens microstructures, and wherein a refractive index of the lens microstructure is greater than a refractive index of the prism microstructure.

10. The backlight module according to claim 9, wherein each of the light emitting elements has an optical axis, and a shape of each of the light mixing microstructures is bilaterally symmetric with respect to an optical axis of a corresponding one of the light emitting elements.

11. The backlight module according to claim 9, wherein an optical axis of each of the light emitting elements is served as a symmetry axis of a corresponding one of the concentrating microstructures, and a shape of each of the concentrating microstructures is bilaterally symmetrical with respect to the symmetry axis.

12. The backlight module according to claim 9, wherein each of the concentrating microstructures is bilaterally symmetric with respect to a central axis of a corresponding one of the light mixing microstructures.

13. The backlight module according to claim 9, wherein the prism microstructure has a triangular prism structure.

14. The backlight module according to claim 9, wherein a refractive index of the light mixing microstructure is less than or equal to a refractive index of the optical film.

15. The backlight module according to claim 9, herein the backlight module further comprises a diffusion film layer disposed on the plurality of concentrating mi crostructures.

* * * * *